United States Patent [19]
Hendrickson et al.

[11] 3,732,480
[45] May 8, 1973

[54] OPEN LOOP STEPPING MOTOR ACCELERATION-DECELERATION CONTROL

[75] Inventors: Kenneth E. Hendrickson, Rochester; Larry F. Mattson, Pine Island, both of Minn.

[73] Assignee: International Business Machines Corporation, Armonk, N.Y.

[22] Filed: Mar. 1, 1971

[21] Appl. No.: 120,031

[52] U.S. Cl. ............... 318/696, 318/385, 318/400
[51] Int. Cl. ............................................. H02k 37/00
[58] Field of Search ............ 318/696, 685, 138, 318/254, 385, 400

[56] References Cited

UNITED STATES PATENTS

| | | | |
|---|---|---|---|
| 3,553,549 | 1/1971 | Leenhouts | 318/696 |
| 3,466,517 | 9/1969 | Leenhouts | 318/696 |
| 3,588,662 | 6/1971 | Buebel et al. | 318/696 |
| 3,466,520 | 9/1969 | Aylixei et al. | 318/696 |
| 3,345,547 | 10/1967 | Dunne | 318/696 |
| 3,328,658 | 6/1967 | Thompson | 318/696 |
| 3,505,579 | 4/1970 | Leenhouts et al. | 318/696 |
| 3,593,096 | 7/1971 | Newell | 318/696 |
| 3,411,058 | 12/1968 | Madsen et al. | 318/34 S |
| 3,593,097 | 7/1971 | Gebelein | 318/138 |
| 3,312,885 | 4/1967 | Falk et al. | 318/138 X |
| 3,458,720 | 7/1969 | Masel et al. | 318/138 |
| 3,423,658 | 1/1969 | Barrus | 318/696 |

Primary Examiner—G. R. Simmons
Attorney—Hanifin & Jancin and Karl O. Hesse

[57] ABSTRACT

A logic control method and system for controlling the operation of a stepping motor having a known load to provide incremental motion of the motor without feedback. Time is measured whenever the motor is accelerating or decelerating and pulses are generated whenever predetermined periods of time have passed. The pulses are used to selectively energize windings of the motor in sequence to provide maximum acceleration; to reach running velocity without excessive overshoot or hunting; and to provide controlled deceleration to bring the motor to rest at any one of a plurality of equilibrium angles.

16 Claims, 11 Drawing Figures

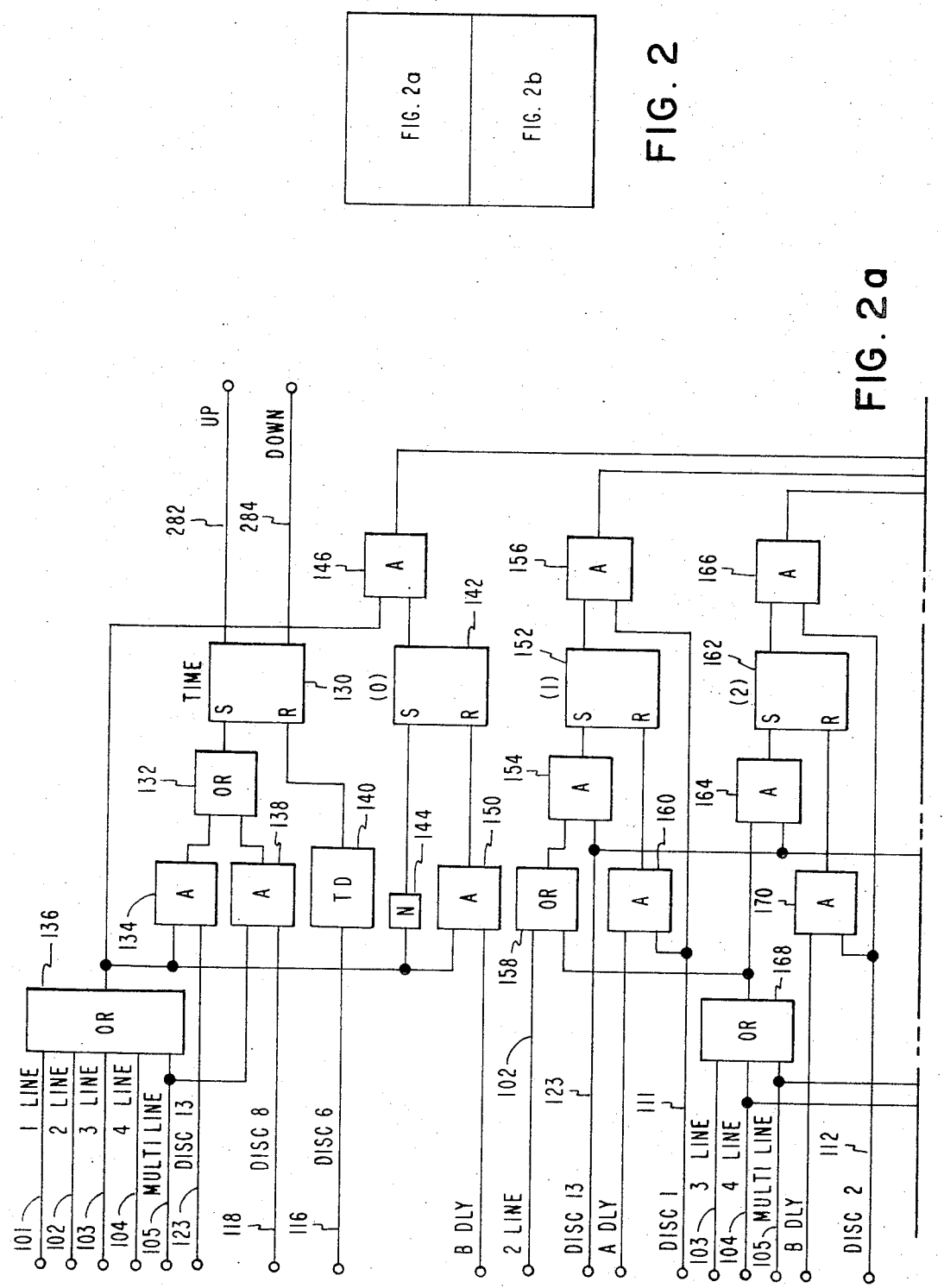

OPEN LOOP STEPPING MOTOR ACCELERATION-DECELERATION CONTROL

FIELD OF THE INVENTION

This invention relates to open loop stepping motor control systems in general, and more particularly to the control of a stepping motor for providing paper movement in a printer.

DESCRIPTION OF THE PRIOR ART

The use of open loop control systems for controlling the operation of stepping motors is known and has certain advantages over closed loop systems. One of these advantages is cost. An open loop system does not require the motor position transducers and amplifiers which must be included in a closed loop system for measuring the actual motor position on a real time basis. Another advantage of an open loop motor control system is that it is inherently synchronous and the motor speed can therefore be easily matched to the speed of other parts of a mechanical system such as a printer. The speed of a motor being controlled by a closed loop system will vary with variations in the load being driven unless an elaborate phase locked loop control system is employed, whereas only the phase of the motor will vary with load in an open loop system.

Another advantage of an open loop system when applied to a printer or other paper moving machines is that the motor will lose synchronism and provide a net zero torque when a paper jam occurs resulting in an overload on the motor. A closed loop control system would merely slow down and adjust its switching times on a real time basis to continue to provide a positive and increased torque. This will result in more paper being jammed in on top of the existing jam which is not a desirable result. An open loop system predicts the motor position, based upon calculations made during system design, which take into account the acceleration load, the frictional load, and the motor torque as a function of winding current and rotor position.

One of the disadvantages of prior art open loop motor control systems, is that the motor torque, being a function of winding current is affected by the voltage of the power supply driving the motor. In prior art devices, this has necessitated the use of a well-regulated power supply to provide the large amounts of power used by the stepping motor. The need for a well-regulated motor power supply has drastically increased the cost of the overall system hardware and also, operating efficiency in that, regulated power supplies are somewhat less efficient than unregulated power supplies.

Another disadvantage encountered when using prior art open loop stepping motor control systems is that, inaccurate switching angles result from the effect of power supply variations. These inaccurate switching angles can cause the motor to overshoot its running velocity during acceleration and cause excessive hunting about the running velocity, which in many cases has caused loss of synchronism under normal load conditions and thereby, complete loss of motor position control. At best, inaccurate switching angles prevents the motor from being operated to give maximum acceleration and deceleration and therefore the time required to increment the stepping motor from a first equilibrium position to a second equilibrium position will be increased.

SUMMARY OF THE INVENTION

It is a primary object of this invention to improve the control of a stepping motor without the need to resort to feedback circuits.

It is a further object of this invention to more accurately control a stepping motor with an open loop control system by adjusting the motor switching times to compensate for variations in the voltage of the motor power supply.

It is a still further object of this invention to improve and minimize the response time required to increment a stepping motor with an open loop control system.

It is a still further object of this invention to improve and minimize the response time required to increment a stepping motor from a first equilibrium angle through one or more steps to a second equilibrium angle in a continuous motion with an open loop control system.

It is another object of this invention to minimize the danger of excessive hunting and loss of synchronism in the control of a stepping motor with an open loop control system.

The above objects are accomplished by providing an improved time measuring means within an open loop stepping motor control system. The improved time measuring means measures predetermined non-uniform periods of time of high resolution to allow infinite choice of switching angles, in order to obtain optimum acceleration, velocity, and deceleration. The improved time measuring means further varies the above predetermined time periods, in amounts which are inversely proportional to the variations in the output voltage of the stepping motor power supply, thereby maintaining the correct and optimum switching angles, even though the time at which these optimum angles occur may vary.

BRIEF DESCRIPTION OF THE DRAWINGS

FIG. 2 is drawn in two parts labeled 2a and 2b for drafting convenience.

FIG. 3 includes a ramp generator and a plurality of comparators for providing pulses corresponding to predetermined periods of time as the ramp generator voltage exceeds predetermined voltage thresholds.

DESCRIPTION OF THE PREFERRED EMBODIMENT

Figure 1:
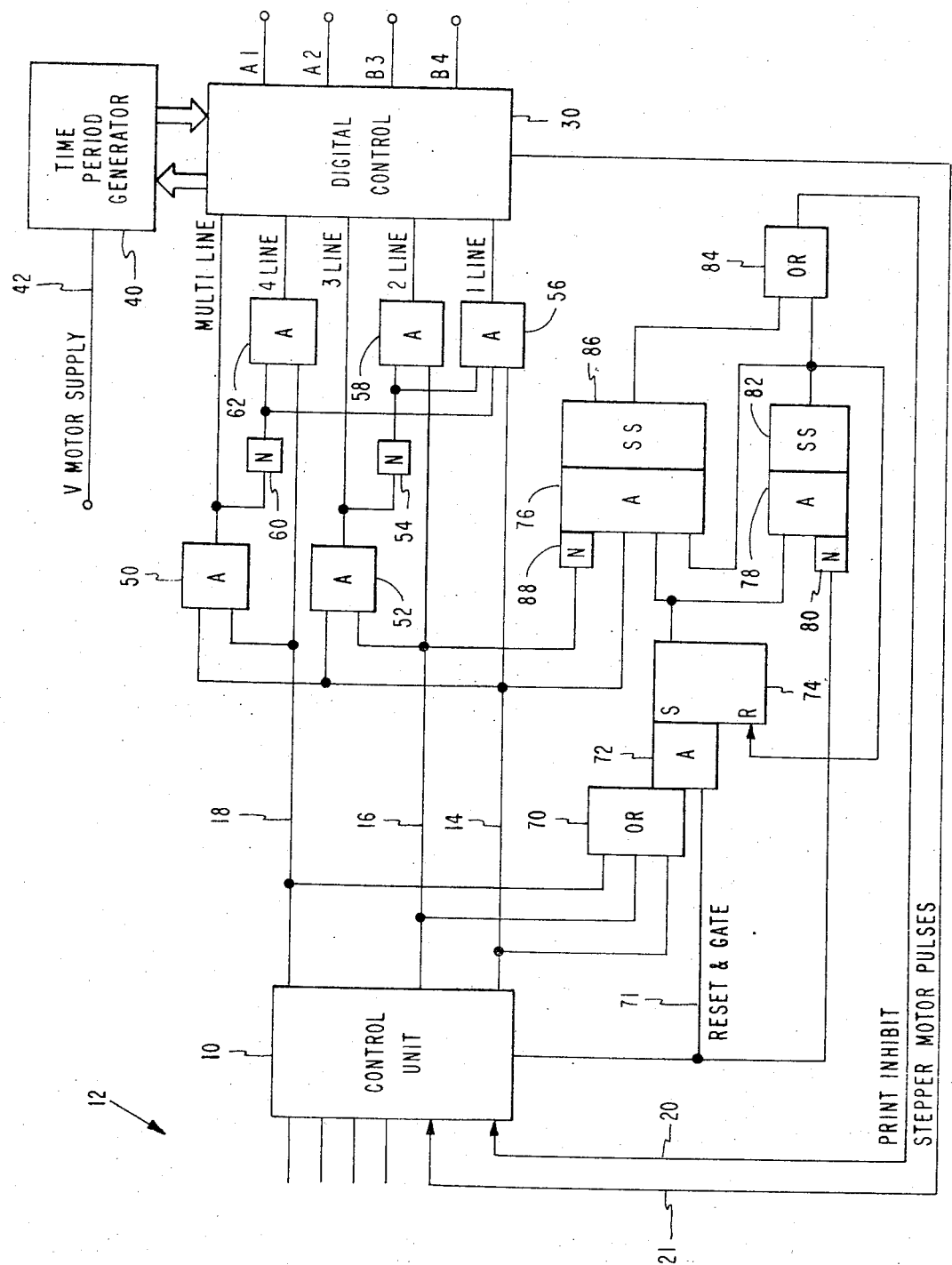
FIG. 1 shows an overall block diagram of a preferred embodiment of the invention as applied to control of a stepping motor, which increments paper within a printer.

With reference to FIG. 1, apparatus for controlling the operation of a stepping motor having a known load, to provide incremental motion of the motor without feedback will now be described.

In order that a computer may be able to initiate the motion of paper through a printer, and cause information to be printed, thereon, while simultaneously performing calculations and other tasks, a control unit 10 is provided, to store and retransmit commands and information to a printer. A plurality of lines 12 comprising a channel interface, well-known in the art of digital computers, connects the control unit 10 with the computer. A second plurality of line numbered 14, 16 and 18 respectively, connect control unit 10 to the logic circuitry and block diagrams of FIG. 1. Lines 14, 16 and 18 carry information representing the number the lines which the paper in the printer is to be moved under control of the stepping motor. Other lines, not shown, would also connect control unit 10 to print hammers through digital circuitry, not shown, and not part of this invention to cause information stored within control unit 10 to be printed on the paper, after the paper has been moved to the proper line. The information on lines 14, 16 and 18 is in binary form. For example, if line 14 is at a positive level, the paper is to be moved one line. If line 16 is at a positive level, the paper is to be moved two lines. If lines 14 and 16 are at a positive level, the paper is to be moved three lines. If line 18 is at a positive level, the paper is to be moved four lines and if lines 14 and 18 are simultaneously at a positive level, the paper is to be moved a plurality of lines determined by the length of time during which lines 14 and 18 are at a positive level. Lines 20 and 21 connect the logic circuitry and block diagrams of FIG. 1 to the control unit, providing information concerning the status of the paper in the printer. For example, line 20 will provide a signal at a positive level, to indicate to control unit 10 that sufficient time has passed after RESET AND GATE line 71 has gone down to insure that the paper has reached its desired rest position and that the print hammers, not shown, can be fired. Line 21 carries stepper motor pulses from digital control 30 to control unit 10, allowing control unit 10 to determined how many steps have been taken by the stepping motor and therefore, how many lines the paper has traveled. Line 21 is especially important when a MULTI-LINE paper movement is being performed. In that case, control unit 10 activates lines 14 and 18 and keeps them active until the paper approaches its final rest position. Control unit 10 knows when the paper is approaching its final rest position by counting the number of stepper motor pulses it receives from digital control 30 over line 21.

Figure 4:
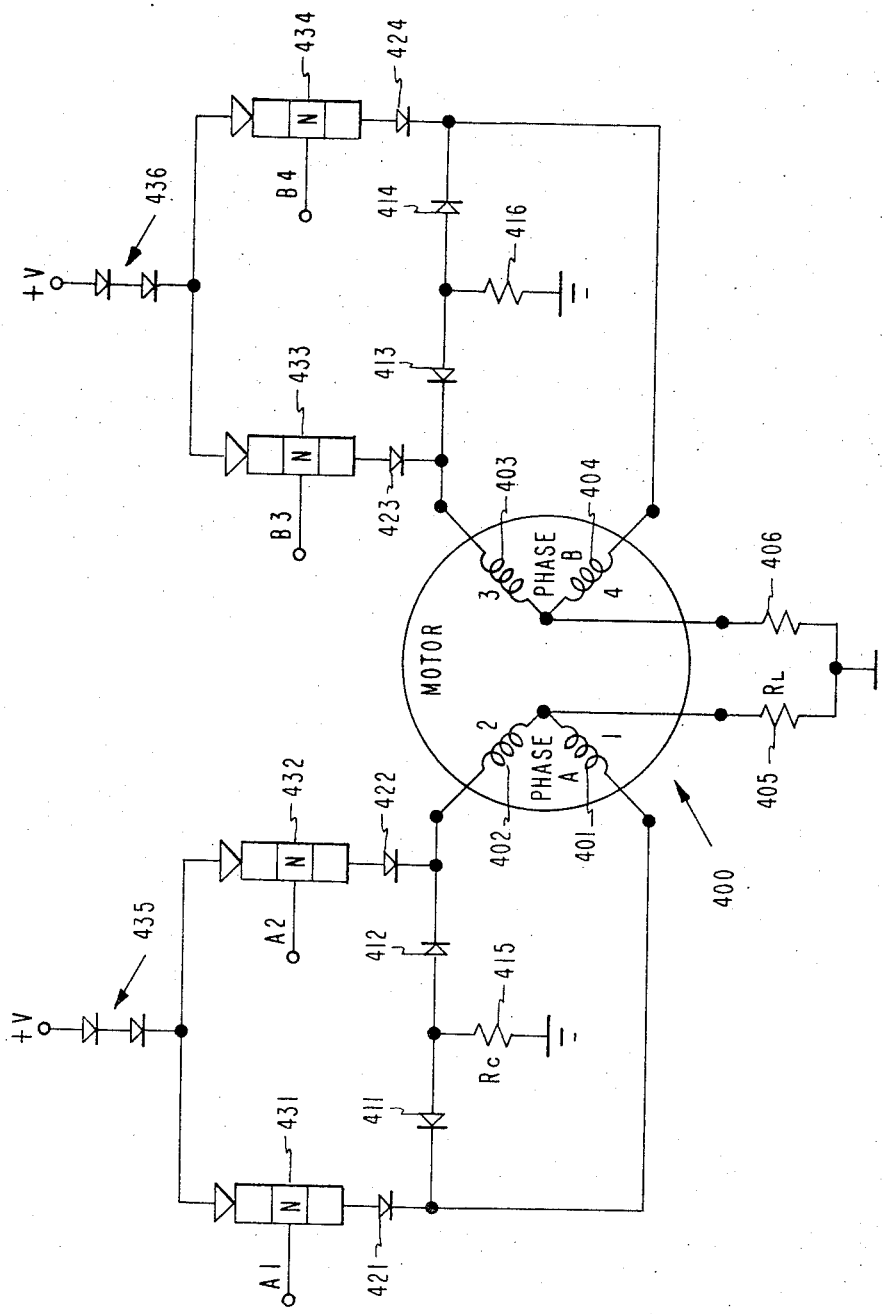
FIG. 4 shows a circuit schematic of the stepping motor and its driving transistors.

In order to switch power to the motor winding in the proper sequence and at the proper times and thereby at the correct switching angles for each desired motor increment, a switching means including digital control 30 of FIG. 1 and transistor drivers of FIG. 4 is provided. The details of digital control 30 will be discussed later, with reference to FIG. 2. Digital control 30 provides outputs to time period generator 40 and to the transistor drivers of the stepping motor, as shown in FIG. 4, for selectively connecting power from a power supply to windings of the motor when predetermined periods of time have passed.

Time period generator 40 generates the plurality of highly resolved predetermined time periods required by digital control 30, in order to switch power to the winding of the stepping motor, at the proper switching angles. An input to time period generator 40 from digital control 30, initiates the measurement of time within time period generator 40. A line 42 from the motor power supply is connected to time period generator 40, in order to allow time period generator 40 to vary its generated time period by amounts which are inversely proportional to the variations of the voltage of the motor power supply.

In order to convert the binary signals appearing on lines 14, 16 and 18 to decimal control signals, five AND gates and two inverters are provided. The inputs to AND gate 50 are connected to lines 14 and 18, in order to generate the MULTI-LINE signal. The inputs to AND gate 52 are connected to line 14 and 16 respectively, to generate the 3 LINE signal. The output to AND gate 52 is inverted by inverter 54 and applied as one of the inputs to AND gates 56 and 58. The other input of AND gate 56 is connected to line 14, in order to generate a 1 LINE signal and not be active when the 3 LINE signal is active. The other input of AND gate 58 is connected to line 16, in order to generate a 2 LINE signal, which is not active when the 3 LINE signal is active. The output of AND gate 50 is inverted by inverter 60 and connected to AND gate 62. The other input to AND gate 62 is connected to line 18, in order to generate a 4 LINE signal which is not active when the MULTI-LINE signal is active.

In order to prevent printing, while the paper is in motion, a plurality of logic circuits are provided and will now be described. These logic circuits allow the control unit to initiate printing as soon as the paper movement has stopped and to initiate paper movement as soon as the printing has been completed, thereby, greatly, increasing throughput over prior art devices which have fixed incrementing periods and fixed print periods, each requiring a sufficient length of time to cover the worst case situation.

The sequence of the operation is as follows: Whenever printing is not being performed, RESET AND GATE line 71 is active to hold all print hammer drivers off, thereby preventing erroneous hammer action caused by electrical noise. RESET AND GATE line 71 will be active while the stepping motor is moving paper within the printer. Line 21 feeds step pulses to the control unit allowing the control unit to count the number of lines which the paper is moving and when the paper has approached the proper position, control unit 10 deactivates RESET AND GATE line 71 to allow the hammer drivers, not shown, to initiate print hammer motion.

Specific circuitry for preventing hammer movement while the paper is settling to its final resting position will now be described.

OR circuit 70 has three inputs connected to line 14, 16 and 18 respectively, for providing an output whenever any paper motion is commanded by control unit 10. At the same time, as control unit 10 is initiating paper movement by signals on lines 14, 16, or 18, it will be holding the hammer drivers reset by activating RESET AND GATE line 71. AND gate 72 having inputs connected to the output of OR gate 70 and to RESET AND GATE line 71 will set print inhibit latch 74 when paper motion is initiated. The output of print inhibit latch 74 is connected to AND gates 76 and 78. RESET AND GATE line 71 is connected to the other input of AND gate 78 through inverter 80, thereby, conditioning AND gate 78 whenever latch 74 is set and RESET AND GATE line 71 goes down. This condition signifies that the AND gate 78 is connected to the input of single shot 82, which generates a 15 millisecond pulse. The output of single shot 82 is connected to one input to OR circuit 84 to transmit the 15 millisecond pulse back to control unit 10, as a print inhibit signal, thereby, causing control unit 10 in inhibit printing for 51 milliseconds beyond the fall of RESET AND GATE signal, to allow the paper to settle to its final rest position, before the print hammers hit the paper. It has been found that in this particular printer, it takes more time for the paper to settle when it is incremented one line or five lines or more, than it takes when the paper is incremented two lines, three lines, or four lines. For this reason, a second AND gate 76 is provided to condition a second single shot 86 to provide a 25 millisecond pulse, whenever the paper is being moved one line, five lines, or move. The inputs to AND gates 76 are connected to the output of single shot 82, the output of latch 74 line 14 and the output of inverter 88, whose input is connected to line 16. With these connections, AND gate 76 will be active only after RESET AND GATE line 71 goes down and a one line, five line, or multi-line paper movement is being performed. The output of single shot 86, which is 25 milliseconds long is connected to the second input of OR gate 84, effectively extending the output of the print inhibit signal to 25 milliseconds under the above mentioned contitions. This prevents the print hammers from hitting the paper before the paper has settled to its final rest position.

Having completed the description of the overall logical control system, as shown in FIG. 1, the detailed circuitry comprising time period generator 40, will now be described. As described earlier, with reference to FIG. 1, time period generator 40 measures periods of time whenever the motor is accelerating and whenever the motor is decelerating by accumulating values in an accumulator means. Analog time period measuring apparatus have been chosen for this embodiment of the invention. In this embodiment, time period generator 40 comprises a voltage ramp generating means 250 for accumulating current to give a ramp voltage output, and a plurality of voltage comparison means 300. Whenever control unit 10 calls for paper motion, digital control 30 responds by causing the motor to accelerate and sends a signal to time period generator 40 causing ramp generator 250 to begin providing a linearly rising and falling signal at its output. As the output voltage of ramp generator 250 rises and falls, comparators 300 will provide outputs at selected voltage thresholds, indicating that predetermined periods of time have passed. In addition, the time measuring means embodied in time period generator 40 includes compensation means for adjusting the predetermined time periods to be indirectly proportional to the voltage of the power supply supplying power to the motor.

The detailed circuitry of ramp generator 250, shown in FIG. 3, will now be described. Operational amplifier 252 has a capacitor 254 connected between its output and its negative input. Capacitor 254 acts in conjunction with current source 258 and resistor 256 to generate a positive ramp and a negative ramp respectively, by the well-known principles of current integration commonly used in analog computers. Operational amplifier 252 has the anode of diode 286 connected to its negative input and the cathode of diode 286 connected to its positive input. Diode 286 prevents the output of amplifier 252 from going below +2.18 volts. Operation amplifier 252 has a resistor 260 connected between its positive input and a positive voltage supply such as +12 volts. Zener diode 262 is also connected to the positive terminal of operational amplifier 252 and the other terminal of zener diode 262 is connected to ground. Resistor 260 and zener diode 262 operate to bias the positive input of amplifier 252 at some fixed positive voltage, such as +2.18 volts above ground reference level, in order to allow current source 258 to function properly. Resistor 256 performs the function of a positive current source and is connected between line 42 which is in turn connected to the positive voltage of the motor power supply and the anode of diode 264. Resistor 256 being connected to the motor power supply, acts as a compensation means to make the predetermined time periods vary inversely proportionately to the motor power supply voltage variations. The cathode of diode 264 is connected to the negative input of the operational amplifier 252. The anode of diode 264 is also connected to the collector of transistor 266. Transistor 266 controls current flow into capacitor 254 through diode 264 from resistor 256. Whenever transistor 266 is rendered conducting by providing a positive level at its base, current from resistor 256 is shunted to ground reference potential and therefore, does not act to generate a negative ramp voltage, as it does when transistor 266 is nonconducting. The negative input of amplifier 252 is also connected to the anode of diode 268. The cathode of diode 268 is connected to current source 258 at the collector of transistor 270. The emitter of transistor 270 is connected to resistor 272, which is in turn, connected to ground reference. The base of transistor 270 is connected to the anode of diode 274, to the collector of transistor 276, and to resistor 278. The other terminal of resistor 278 is connected to line 42 which is, in turn, connected to the positive voltage motor supply. Resistor 278, being connected to the motor power supply, acts as a compensation means to make the predetermined time periods vary inversely proportionately to the motor power supply variations by controlling the output of ramp generator 250 to be directly proportional to the motor power supply. The cathode of diode 274 is connected to resistor 280 which is, in turn, connected to ground reference. Resistors 278 and 280 act as a voltage divider to bias the base of transistor 270 at a fixed voltage which is a function of the voltage of the motor power supply. When biased at such a fixed voltage, transistor 270, in conjunction with resistor 272 acts as a current source, drawing current from capacitor 254 through diode 268, thereby, causing the voltage at the negative input of amplifier 252 to go negative. This in turn, causes the output voltage of amplifier 252 to rise as a linear ramp while capacitor 254 is charged by current conducted through current source 258. The emitter of transistor 276 is connected to ground reference potential, allowing transistor 276 to shunt current from resistor 278 to ground whenever a positive level signal appears at the base of transistor 276, thereby rendering transistor 270 nonconducting and therefore, terminating the rise of the output voltage of amplifier 252. The output voltage of ramp generator 250 is shown graphically in FIGS. 5 through 10 for various elapsed times. As can be seen from FIG. 9, ramp generator 250 provides an alternately rising and falling saw tooth type waveform, at its output, while the stepping motor is operating at running velocity under a MULTI-LINE paper motion command from control unit 10. This allows the plurality of comparators 300 to utilize the same sequence for causing the proper deceleration switching angles for any paper motion in excess of four lines.

The following description and explanation relates to the detailed circuitry of comparators 300 and how they provide outputs at predetermined time periods. This embodiment, includes 12 comparators, each comparator switching at a different one of 12 voltage threshold levels. In order to conserve space, and avoid duplicate description, the detailed connections of all of the comparators are not shown. Only that detail necessary to comprehend and utilize the invention is shown, it being understood by those skilled in the art that the remaining comparators not shown, are connected in like manner. In order to provide the plurality of voltage thresholds, a plurality of reference voltages are generated by a resistor divider network connected to a fixed precision reference voltage at node 302. In this embodiment, a reference voltage of 5 volts has been chosen. Resistors 304 through 318 are connected in series between node 302 and ground. The interconnections of resistors 304 through 318 provide a series of nodes at various voltage reference levels equal to or less than +5 volts. One terminal of each of comparators 322 through 336 is connected to a node of the resistor voltage divider. For example, comparator 322 has its reference terminal connected to the node between resistors 304 and 306. All of the comparators 323 through 336 are connected to like manner, including the additional four comparators not shown. The second input of each comparator is connected to terminal 301, which carries the ramp voltage generated by ramp generator 250. The output of each of the comparators which measures a voltage threshold, while the ramp voltage is rising is used directly, and labeled DISC 1, DISC 2, DISC 3, DISC 4, DISC 5 and DISC 6. Each DISC 1 through 6 signal corresponds to a predetermined time period which is inversely proportional to the slope of the positive ramp voltage provided by ramp generator 250. DISC 5 is an output of one of the comparators, not shown in FIG. 3.

The outputs of all of these comparators which switch at a voltage threshold while the ramp is going down are inverted. For this reason, inverters 338, 340, 342 and 346 are connected to the output of comparators 326, 330, 332 and 336 respectively. It is noted that comparator 330 detects a voltage threshold at the up going ramp as well as detecting that same voltage threshold at the down going ramp. The outputs of the inverters connected to comparators sensing voltage threshold, while the ramp voltage is going down, are labeled DISC 13, DISC 12, DISC 11, DISC 10, DISC 9, DISC 8 and DISC 7. Reference to any of FIGS. 5 through 9 will show how signals labeled DISC 1 through DISC 13 occur at the end of predetermined time periods dependent upon the voltage threshold at which the respective comparator is set to switch. The actual voltages used in this embodiment are shown in FIGS. 5 through 9 on the vertical axis of the ramp graph. The particular predetermined time periods, corresponding with the threshold voltages are shown on the horizontal axis of the graphs of FIGS. 5 through 9.

Having described a detailed embodiment of time period generator 40, the detailed logic of digital control 30, shown in FIG. 2, will now be described. The description includes an explanation of how digital control 30 acts upon the command received from control unit 10, initiates time measurement by time period generator 40 and operates under control of outputs from time period generator 40 labeled DISC 1 through DISC 13 to sequentially switch power to selected windings of the stepper motor at times corresponding to switching angles which will give maximum acceleration, correct velocity, and controlled deceleration resulting in accurate positioning of the stepper motor.

Digital control 30 initiates and controls time period generator 40 through the outputs of time latch 130. The "on" output of latch 130 is connected to line 282, which is, in turn, connected to the base of transistor 266 of FIG. 3. The "off" output of latch 130 is connected to line 284, which is, in turn, connected to the base of transistor 276 of FIG. 3. The signals on lines 282 and 284 are the complement of each other and therefore when the "on" output of latch 130 is at a positive level, the "off" output of latch 130 is at a negative level. When latch 130 is set to "on" condition, the positive signal on line 282 causes transistor 266 to conduct and transistor 276 of FIG. 3 to be nonconducting. Under these conditions, current generator 258 will be active, causing the output of operational amplifier 252 to rise in a positive ramp. Whenever time latch 130 is in the "off" condition, the output of ramp generator 250 will be a negative slope, until it reaches approximately +2.18 volts, at which time the negative input of operational amplifier 252 will begin to go positive, allowing diode 286 to conduct and thereby, shunt charging current from the resistor 256 to ground, rather than allowing it to continue to accumulate in capacitor 254. After diode 286 begins to conduct, the output of ramp generator 250 remains at a constant level, approximately equal to +2.18 volts. Two conditions will set time latch 130. OR gate 136 has inputs connected to lines 101, 102, 103, 104 and 105 and provides an output when ever control unit 10 calls for paper movement. The output of OR gate 136 is connected to a first input of AND gate 134. A second input of AND gate 134 is connected to line 123, labeled DISC 13 which is connected to the output of inverter 346 of FIG. 3. The output of AND gate 134 is connected to one input of OR gate 132 to actuate OR gate 132 and set time latch 130, whenever control unit 10 calls for paper movement and ramp generator 250 is in its stable down level. A second AND gate 138 has a first input connected to line 105 and a second input connected to line 118, labeled DISC 8. AND gate 138 has an output connected to another input of OR gate 132, to set latch 130, whenever a MULTI-LINE paper movement is still being called for by control unit 10 and ramp generator 200 has just caused the comparator which switches at the DISC 8 threshold to provide an output. Latch 130 is reset by a delayed signal from comparator 322 on line 116, labeled DISC 6 which is delayed in time delay circuit 140. Time delay circuit 140 insures that a logic race condition does not occur as comparator 322 is switching on the up ramp and time latch 130 is causing ramp generator 250 to switch from an up ramp to a down ramp.

In order to enable digital control 30 to selectively respond to signal DISC 1 through DISC 13, 14 enable latches are provided. Enable latches (0) through (4) and (12), (13) are shown in FIG. 2, along with their set and reset logic. Enable latches (5) through (11) are connected in the same manner, as the latches shown in FIG. 2 and have set and reset logic also connected in the same way. Enable (0) latch 142 is set when no signal is present on lines 101 through 105 by inverting the output signal from OR gate 136 with inverter 144. The "on" output of enable (0) latch 142 is connected to one input of AND gate 146. The other input of AND gate 146 is connected to the output of OR gate 136. AND gate 146 provides an output to initiate motor acceleration when any paper movement command first appears on lines 101 through 105. The output of AND gate 146 is connected to one input of OR gate 148. Enable (0) latch 142 is reset by the output of AND gate 150, which has a first input connected to the output of OR gate 136 and a second input connected to the output of time delay 214, which provides a delayed signal corresponding to the B phase motor switching waveform. The output of AND gate 146 is therefore a pulse of width equal to the delay time of time delay 214.

Enable (1) latch 152 is set by the output of AND gate 154 whenever a two, three, four or multi-line paper motion command is first received. AND gate 154 has one input connected to DISC 13 line 123 and another input connected to the output of OR circuit 158. OR circuit 158 has one input connected to line 102 and another input connected to the OR circuit 168, which will be described shortly. The "on" output of enable (1) latch 152 is connected to one input of AND gate 156. The other input of AND gate 156 is connected to DISC 1 line 111. The output of AND gate 156 is connected to an input of OR gate 148. Enable (1) latch 152 is reset by the output of AND gate 160, which has a first input connected to DISC 1 line 111 and another input connected to the output of time delay 216, labeled A DLY.

Enable (2) latch 162 is set by the output of AND gate 164, whenever a three, four or five line paper movement command is first received from control unit 10. AND gate 164 has a first input connected to the output of OR gate 168, which in turn, has inputs connected to line 103, 104 and 105. AND gate 164 has a second input connected to DISC 13, line 123. The "on" output of enable (2) latch 162 is connected to an input of AND gate 166. Another input of AND gate 166 is connected to DISC 2, line 112 and the output of AND gate 166 is connected to an input of OR gate 148. Enable (2) latch 162 is reset by the output of AND gate 170, which has a first input connected to the output of time delay 214 labeled B DLY and a second input to DISC 2 line 112.

Enable (3) latch 172 is set by the output of AND gate 174, whenever a two line paper movement command is first received from control unit 10. A first input of AND gate 174 is connected to line 102 and a second input is connected to DISC 13, line 123. The "on" output of enable (3) latch 172 is connected to an input of AND gate 176. A second input of AND gate 176 is connected to DISC 3, line 113 and the output of AND gate 176 is connected to an input of OR gate 148. Enable (3) latch 172 is reset by the output of AND gate 180. AND gate 180 has a first input connected to the output of time delay 214 and a second input connected to DISC 3, line 113.

Enable (4) latch 182 is set by the output of AND gate 184, whenever a one, four or multi-line paper movement command is first received from control unit 10. AND gate 184 has a first input connected to the output of OR gate 188, which, in turn, has inputs connected to lines 101, 104 and 105. A second input to AND gate 184 is connected DISC 13, line 123. The "on" output of enable (4) latch 182 is connected to an input of AND gate 186. A second input of AND gate 186 is connected to DISC 4, line 114. The output of AND gate 186 is connected to an input of OR gate 148. Enable (4) latch 182 is reset by the output of AND gate 190, which has a first input connected to the output of time delay 216, labeled, A DLY and a second input connected to DISC 4, line 114.

An enable (5) latch, not shown, is also set by the output of a set AND gate, whenever a three, four, or multi-line paper movement command is first received from control unit 10. One input of the set AND gate would be connected to the output of an OR gate which would in turn have input connected to lines 103, 104 and 105. The "on" output of enable (5) latch would be connected to one input of an AND gate, whose output would be connected to one input of OR gate 148. The other input of this AND gate would be connected to DISC 5, line. Enable (5) latch would be reset by the output of an AND gate having inputs connected to DISC 5 line and the output of time delay 214, labeled B DLY.

An enable (6) latch, also not shown, is set by the output of a first set AND gate, whenever a four line or multi-line paper movement is first received from control unit 10. The set first AND gate connected to lines 104 and 105 and a second input connected to DISC 13, line 123. Enable (6) latch is also set by the output of a second set AND gate whenever a MULTI-LINE signal is still present on line 105 when the DISC 8 signal is generated by time period generator 40. The second set AND gate allows DISC 6 signals to be repeatedly generated in sequence with DISC 8 signals when the paper is being moved more than 5 lines. The "on" output of the enable (6) latch would be connected to an input of an AND gate having an output connected to an input of OR gate 148 and a second input connected to DISC 6 line. Enable (6) latch would be reset by the output of an AND gate having one input connected to DISC 6 line and another input connected to the output of time delay 216.

An enable (7) latch, also not shown, would be set by the output of a set AND gate, after ramp generator 250 had generated a positive ramp of sufficient magnitude causing comparator 322 to generate a signal of DISC 6, line 116 and a two line paper movement command has been received from control unit 10. The set AND gate of enable (7) latch would have a first input connected to DISC 6, line 116 and a second input connected to line 102. The "on" of enable (7) latch would be connected to an AND gate having an output connected one input of OR gate 148 and another input connected to DISC (7) line. Enable (7) latch is reset by the output of an AND gate having a first input connected to DISC 7 line and a second input connected to the output of time delay 216.

An enable (8) latch, also not shown, is set by the output of a set AND gate having inputs connected to DISC 6, line 116 and line 105 to set enable 8 latch, whenever a multi-line paper movement command is being received from control unit 10 and ramp generator 250 has risen to allow comparator 322 to generate DISC 6 signal on line 116. The "on" output of enable (8) latch is connected to an input of an AND gate, whose output is connected to an input of OR gate 148 and having another input connected to DISC 8 line. Enable (8) latch is reset by the output of an AND gate having a first input connected to DISC 8 line and a second input connected to the output of time delay 214.

An enable (9) latch, also not shown, is set by the output of an AND gate, after ramp generator 250 has caused comparator 322 to generator a DISC 6 signal and a multi-line paper movement command is received from control unit 10. The AND gate which sets enable (9) latch has an input connected to DISC 6, line 116 and another input connected to line 105. The "on" output of enable (9) latch is connected to an input of an AND gate having an output connected to an input of OR gate 148 and another input connected to DISC 9 line. Enable (9) latch is reset by the output of an AND gate having an input connected to DISC 9 line and another input connected to the output of time delay 216.

An enable (10) latch, also not shown, is set by the output of an AND gate with a signal on DISC 6 line 116, when a three line or four line paper movement command is being received from control unit 10. The AND gate which sets enable (10) latch has one input connected to DISC 6, line 116 and another input connected to the output of an OR gate, which in turn has inputs connected to the output of an OR gate, which in turn, has inputs connected to lines 103 and 104. The "On" output of enable (10) latch is connected to the input of an AND gate having an output connected to an input of OR gate 148 and another input connected to DISC 10 line. Enable (10) latch is reset by the output of an AND gate having one input connected to DISC 10 line and another input connected to the output of time delay 214.

An enable (11) latch, also not shown, is set by the output of an AND gate having input connected to DISC 6 line 116 and another input connected to line 105 to set enable (11) latch when a DISC 6 signal is generated by comparator 322 and a multi-line paper movement command is being received from control unit 10. The "on" output of enable (11) latch is connected to an input of an AND gate having an output connected to an input of OR gate 148 and having another input connected to DISC 11, line 121. Enable (11) latch is reset by the output of an AND gate having a first input connected to DISC 11, line 121 and another input connected to the output of time delay 214.

An enable (12) latch 192 is set by the output of AND gate 194 having an input connected to DISC 6, line 116 and another input connected to line 104, whenever a four line paper movement command from control unit 10 is present at DISC 6 time. The "on" output of enable (12) latch 192 is connected to an input of AND gate 196 which has an output connected to an input of OR gate 148 and another input connected to DISC 12, line 122. Enable (12) latch 192 is reset by the output of AND gate 200 having an input connected to DISC 12, line 122 and another input connected to the output of time delay 216.

An enable (13) latch 202 is set by the output of AND gate 204 which has an input connected to DISC 6, line 116 and another input connected to line 105 whenever a multi-line paper movement command is present at DISC 6 time. The "on" output of enable (13) latch 202 is connected to an input of AND gate 206, which has an output connected to an input of OR gate 148 and has another input connected to DISC 13, line 123. Enable (13) latch 202 is reset by the output of AND gate 210 which has one input connected to DISC 13, line 123 and another input connected to the output of time delay 216.

The output of OR gate 148 is labeled STEPPER MOTOR PULSES and comprises a sequence of pulse of width equal to the delay time of time delay 214 or 216, alternately. The output of OR gate 148 is connected to line 21 of FIG. 1 and sent back to control unit 10, so that control unit 10 will know how many pulses have been applied to the stepping motor. The output of OR gate 148 is also connected to the clock input of JK flip flop 212. JK flip flop 212 has its "on" and "off" outputs connected back to its J and K inputs respectively, in order that it can operate as a binary counter and change state once for each pulse received from OR gate 148. The "on" output of JK flip flop 212 is connected to the input of time delay 216 and to the clock input of JK flip flop 218 to generate A phase switching waveforms for the stepping motor. The output of time delay 216 is applied to various AND gates, already described, to reset various enable latches. The "on" and "off" output of JK flip flop 218 are connected to J and K inputs respectively, so that JK flip flop 218 also operates as a binary counter, running at one-half the rate of JK flip flop 212. The "on" output of JK flip flop 218 is connected to the input of driver 222 to generate the A1 switching waveform which will be applied to the stepping motor. The "off" output of JK flip flop 218 is connected to the driver 220, which will provide the A2 switching waveform for the stepping motor. The "off" output of JK flip flop 212 is connected to the input of time delay 214 and to the clock input of JK flip flop 224. The output of time delay 214 is connected to various AND gates as previously described, to reset enable gates. JK flip flop 224 has its "on" and "off" outputs connected to J and K inputs respectively, to operate as a binary counter, operating at one-half the rate of JK flip flop 212 and in a 90° phase relationship with JK flip flop 218. The "on" output of JK flip flop 224 is connected to the input of driver 228, which generates the B3 waveform for the stepping motor. The "off" output of JK flip flop 212 is connected to the input of driver 226, which in turn generates the B4 switching waveform, for the stepping motor.

Referring now to FIG. 4, a schematic of the stepping motor and the transistor drivers are shown. The transistor drivers are part of the switching means which also includes digital control 30. The circuits by which the A and B phase signals are selectively connected to the motor windings, will now be described. Stepping motor 400 is shown in schematic form with one terminal of A phase winding 401 connected to one terminal of A phase winding 402 and to one terminal of resistor 405. The other terminal of resistor 405 is connected to ground reference potential. One terminal of each of B phase windings 403 and 404 are also connected together and to one terminal or resistor 406. The input terminal of resistor 406 is also connected to ground reference potential. Each winding 401, 402, 403 and 404 is connected to the cathode of a voltage spike suppression diode 411, 412, 413 and 414 respectively. The anodes of diodes 411 and 142 are connected together and to one terminal of resistor 415, whose other terminal is connected to ground reference potential. The anode of diodes of 413 and 414 are connected together and also connected to one terminal or resistor 416 whose other terminal is connected to ground reference potential. The input terminal input of each of windings 401, 402, 403, and 404 is also connected to the cathode of diodes 421, 422, 423 and 424. The anodes of diodes of 421, 422, 423 and 424 are connected to the collectors of transistors 431, 432, 433 and 434 respectively. The emitters of transistors 431 and 432 are connected to a positive stepping motor voltage supply through biasing diodes 435. The emitters of transistors 433 and 434 are also connected to the positive stepping motor voltage supply through biasing diodes 436. The base of transistor 431 is connected to the output of driver 222, shown in FIG. 2. Likewise, the bases of transistors 432, 433 and 434 are connected to the outputs of drivers 220, 228 and 226 respectively, shown in FIG. 2.

This completes the description of a preferred embodiment of the invention.

OPERATION

In order to provide for a more full understanding of the invention, several examples of incremental motion of a stepper motor under control of the open loop control system which has previously described, will now be shown.

The examples include the step-by-step operation of the preferred embodiment of the invention, as it controls a stepping motor such as HS50 manufactured by Superior Electric Company of Bristol Connecticut, driving a 12 inch oz. friction load and a 0.0093 inch oz. sec² inertia load while moving paper within a printer. The stepping motor is mechanically coupled to the paper so that two steps of the stepping motor moves the paper one line of print. As described earlier, an open loop control system predicts the motor position based upon calculations made during system design which take into account the acceleration load, the frictional load, and the motor torque, as a function of winding currents and motor positions. Equation 1 below, describes the mechanical system.

$$J(d^2\theta/dt^2) = T(i_1,i_2,i_3,i_4,\theta) - T_f \qquad (1)$$

where
$J$ = Total system inertia (motor + load)
$\theta$ = Radian displacement
$i_1, i_2, i_3$, and $i_4$ are the winding currents.
$T(i_1,i_2,i_3,i_4,\theta)$ = Motor torque which is a function of all four winding currents and the rotor position.
$T_f$ = Frictional torque which is approximately constant (coulomb friction) in this application.

The equation for torque is treated as the sum of four terms. Each term is a function of rotor position and one winding current. This is verffified experimentally by taking static torque measurements with 1 and 2 windings energized. The torque dependence on rotor position is shown to be sinusodial by experiment.

The torque dependence on current is non-linear due to magnetic saturation and is mathematically described in a computer program as point-pair information. A linear interpolation is used to describe the functions. Torque dependence on current is obtained experimentally.

The resulting equations for torque for the HS50 are:
$T_1 = T(i_1) \sin(\theta - 4.5°)$
$T_2 = T(i_2) \sin(\theta - 0.9°)$
$T_3 = T(i_3) \sin(\theta - 6.3°)$
$T_4 = T(i_4) \sin(\theta - 2.7°)$ Where $T(i)$ is the non-linear dependence of torque on current and is the same function for each winding. These torques are combined to give the curves shown in FIGS. 5 through 9.

The non-linearity has little effect upon the validity of adding torques caused by individual currents to get total torque because at any time voltage is applied to only one winding on each magnetic structure. Only one winding of each phase A and B is energized at any one time.

The torques, as functions of currents and rotor position, can be calculated using a Digital Computer.

To write the electrical equations for the permanent magnet stepping motors, we refer now to FIG. 4 and will use A1 circuit as an example.

The resistor 405 labeled $R_L$ is a current limiting resistor. It allows the use of a high power supply voltage for rapid current buildup in the motor windings. This helps to achieve satisfactory torque at high step rates.

Diode 421 prevents current from flowing in the reverse direction in one winding when the other winding is switched off. If the reverse current is allowed to flow, it takes longer for current to build up in the motor winding because the buildup starts from a negative rather than zero value. The tendency for reverse current to flow is due to the two windings being wound in opposite directions on the same structure which gives rise to transformer action during switching.

Diode 411 and the resistor 415 labeled $R_C$ form a clamp circuit which protects the transistors from excessive back voltage applied to their collectors when they are switched off. Current in the motor winding is allowed to fall off by flowing through $R_L$, $R_C$, and diode 411.

When transistor 431 is on, the circuit A1, of FIG. 4, is described by equation (3).

$$= d\lambda(i,\theta)/dt + (R_M+R_L)i \qquad (3)$$

where
$\lambda$ = flux linkage in the motor winding ($\lambda=N\theta$).
$R_M$ = resistance of winding 401
$R_L$ = resistor 405

For permanent magnet stepping motors, we may simplify equation (3) by noting that the first term on the right hand side can be expressed as $d\lambda(i,\theta)/dt = L\, di/dt + {}^V$back emf $(\theta, d\theta)/dt$ \qquad (4)

where
$L(di/dt)$ = the rate of change of flux linkage due to the stator field
$^V$back emf = the rate of change of flux linkage due to the permanent magnet rotor field.

Field mapping techniques and experimental measurements show the stator flux path to be independent of rotor position. This results in the inductance being independent of rotor angle. Experimental measurements of inductance show some saturation effects at near rated current, otherwise inductance is constant. In this application, current is never more than 75 percent of rated current so inductance is assumed constant.

The back emf may be experimentally measured, estimated or determined from the torque equations. A power balance equation shows that $^V$back emf $= T(i,\theta) d\theta/dt/i$ for each winding.

The resulting electrical equations for a winding which is energized are:

$$L(di/dt) = E_1 - (R_M+R_L) - V_0(d\theta/dt)\sin(\theta-\theta_o) \qquad (5)$$

where
$E_1$ = voltage applied to winding 1
$V_0$ = amplitude of the back emf
$\theta 0$ = phase angle of $^V$back emf for the appropriate winding.

When transistor 431 is not conducting and current is falling off in the motor winding, the equation describing flux linkage and current is $$0 = d\lambda(i,\theta)/dt + (R_M+R_C+R_L)i \qquad (6)$$

which can be simplified for a permanent magnet stepper motor to $$0 = +L(di/d) + {}^V\text{back emf} + (R_M+R_C+R_L)i \qquad (7)$$

The presence of the diodes imposed an additional contraint on motor current, namely that it can only in the positive direction $$i \geq 0 \qquad (8)$$

Simultaneous solution of the above equations (1) through (7) for all points in time will yield continuous motor position information from which the proper switching angles for maximum acceleration, correct velocity and controlled deceleration can be chosen. The use of a digital computer to simultaneously solve the system equations will be found to be most helpful.

After solving the system equations for the stepping motor, identified above, using a 48 volt power supply and driving the load, identified above, I have found that predetermined time periods of 2.95, 5.1, 5.5, 6.55, 7.8, 9.65, 10.4, 10.69, 12.49, 13.5, 14.2, 15.0, and 17.36 milliseconds, each measured from a single zero time reference, will yield all of the desired optimum switching angles for the system under consideration. Having chosen the above time periods, we proceded via the well-known ohms law to determine the values of resistors 403 through 418 to yield voltage thresholds of 3.05, 3.67, 3.79, 4.09, 4.46, 5.0, 4.78, 4.69, 4.17, 3.87, 3.67, 3.44, and 2.75 volts, all measured from a common reference voltage of +2.18 volts, which have chosen as the most negative, stable output level for ramp generator 250. The time and voltages, just ennumerated are shown clearly, in graphical form, in FIGS. 5 through 9.

The step-by-step sequence by which the open loop control system of the invention will control the above identified motor and load to rotate the motor through two steps, thereby, moving the paper one line of print, will now be described.

When no paper movement commands are being received from control unit 10, OR gate 136 will be providing an inactive output. The inactive output of OR gate 136 is inverted to an active condition by inverter 144 setting enable (0) latch 142. All of the latches will have been reset to an "off" condition by a signal, not shown, which is often called "power on reset" and has been generated by well-known digital logic initializing methods. The signal "power on reset" would also set JK flip flop 212 to an "on" condition, JK flip flop 218 to an "on" condition and JK flip flop 224 to an "off" condition. These initialized conditions of the JK flip flops would cause A phase winding A1, and B phase winding B4 to be energized holding the stepping motor in the stable A1-B4 equilibrium angle, shown in graphical form, as time zero in FIGS. 5 through 9.

Paper movement would be initiated at a computer by sending a paper movement command over channel 12 to control unit 10. Control unit 10, shown in FIG. 1, would in turn activate line 14 enabling AND gate 56 which in turn activates line 101, shown in FIG. 2. As soon as line 101 is active, the output of OR gate 136 will be active. The output of OR gate 136 is ANDED with the one output of enable (0) latch 142 and AND gate 146 to generate a first STEPPER MOTOR PULSE. This pulse propagates through OR gate 148 to flip JK flip flop 212 to an "off" condition energizing time delay 214 which will, after a predetermined time, reset enable (0) latch 142 through AND gate 150. In addition to resetting enable (0) latch JK flip flop 224 will be set by the "off" output of JK flip flop 212, causing B phase winding B4 numbered 404, of the stepper motor shown in FIG. 4, to be de-energized and B phase winding B3 to be energized. When windings A1 and B3 are energized, while the stepper motor is at rest at a zero torque A1 B4 equilibrium position, a maximum accelerating torque is applied to the motor, causing it to begin to rotate. At the same time, that the output of OR gate 136 was resetting JK flip flop 212, it also sets time latch 130 through AND gate 134 and OR gate 132. As soon as time latch 130 is set, its "on" output causes transistor 266 shown in FIG. 3, to conduct and its "off" output causes transistor 276 to be nonconducting. These conditions of transistors 266 and 276 allow current source 258 to draw current from capacitor 254, resulting in a positive ramp voltage at the output of ramp generator 250. This positive ramp voltage is connected to one input of all of the comparators 300 via line 340 causing each comparator to change state when the voltage on line 340 excedes its respective threshold voltage defined by the reference voltage on node 302 and the nodes between resistors 304 and through 318.

Figure 2B:
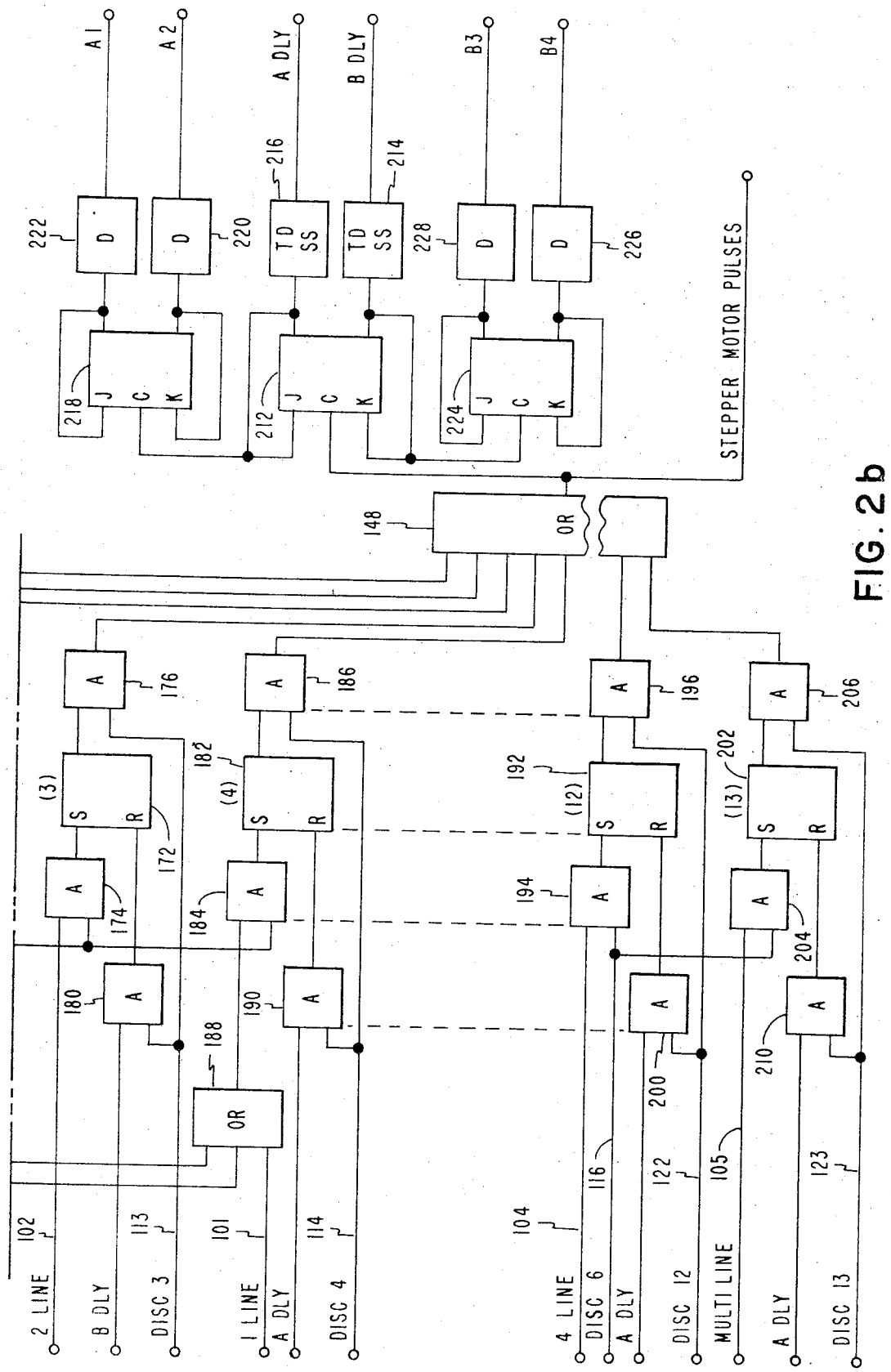
FIG. 2 includes a detailed logic diagram of the logic circuitry within the digital control block of FIG. 1.

In addition to setting time latch 130 and resetting JK flip flop 212, the signal on line 101 calling for a one line paper movement will also set enable (4) latch 182 through OR gate 188 and AND gate 184, shown in FIG. 2. All other enable latches will remain reset.

Figure 3:
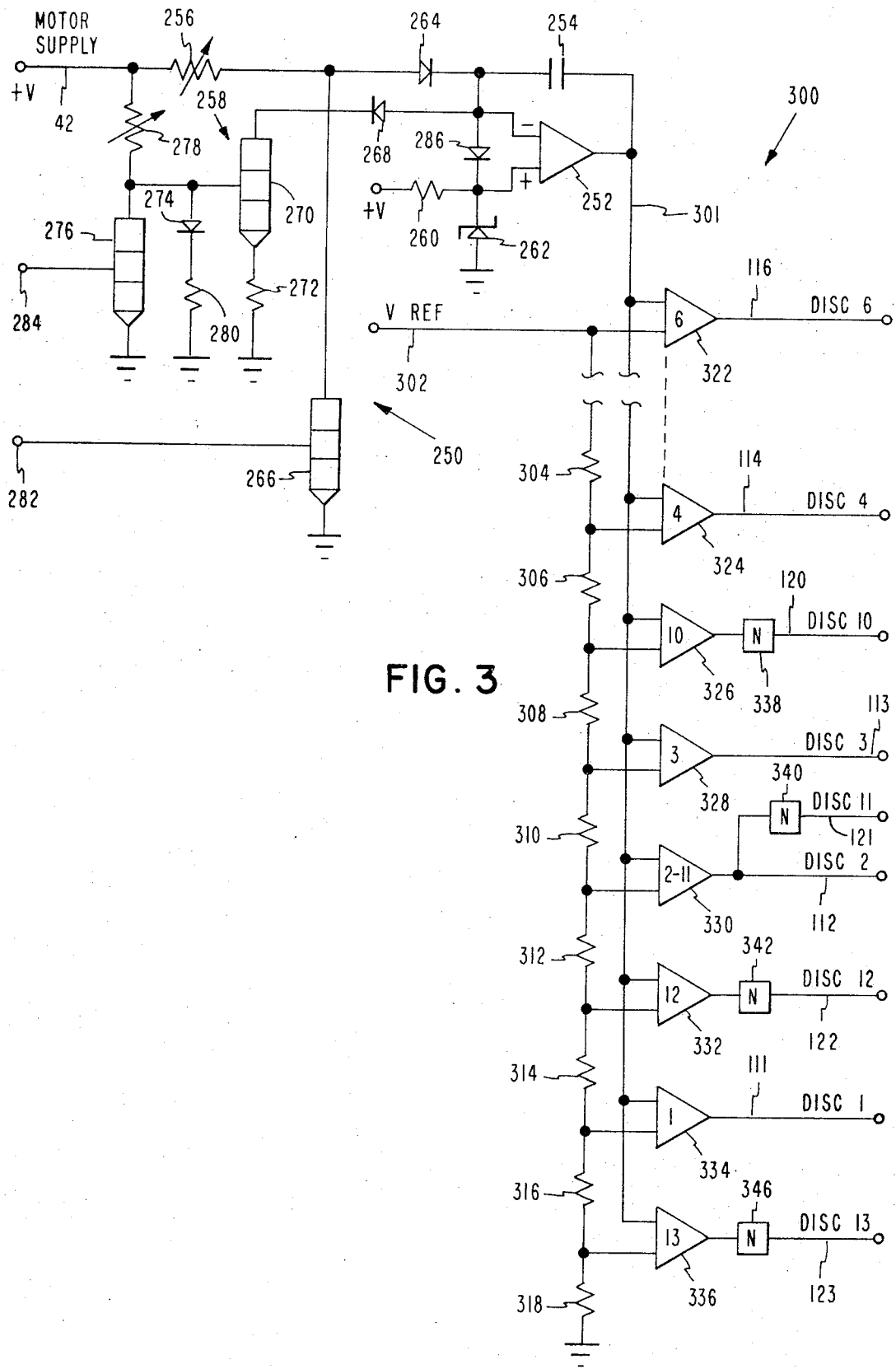
FIG. 3 shows an analog embodiment of the time measuring means of FIG. 1.
Figure 5:
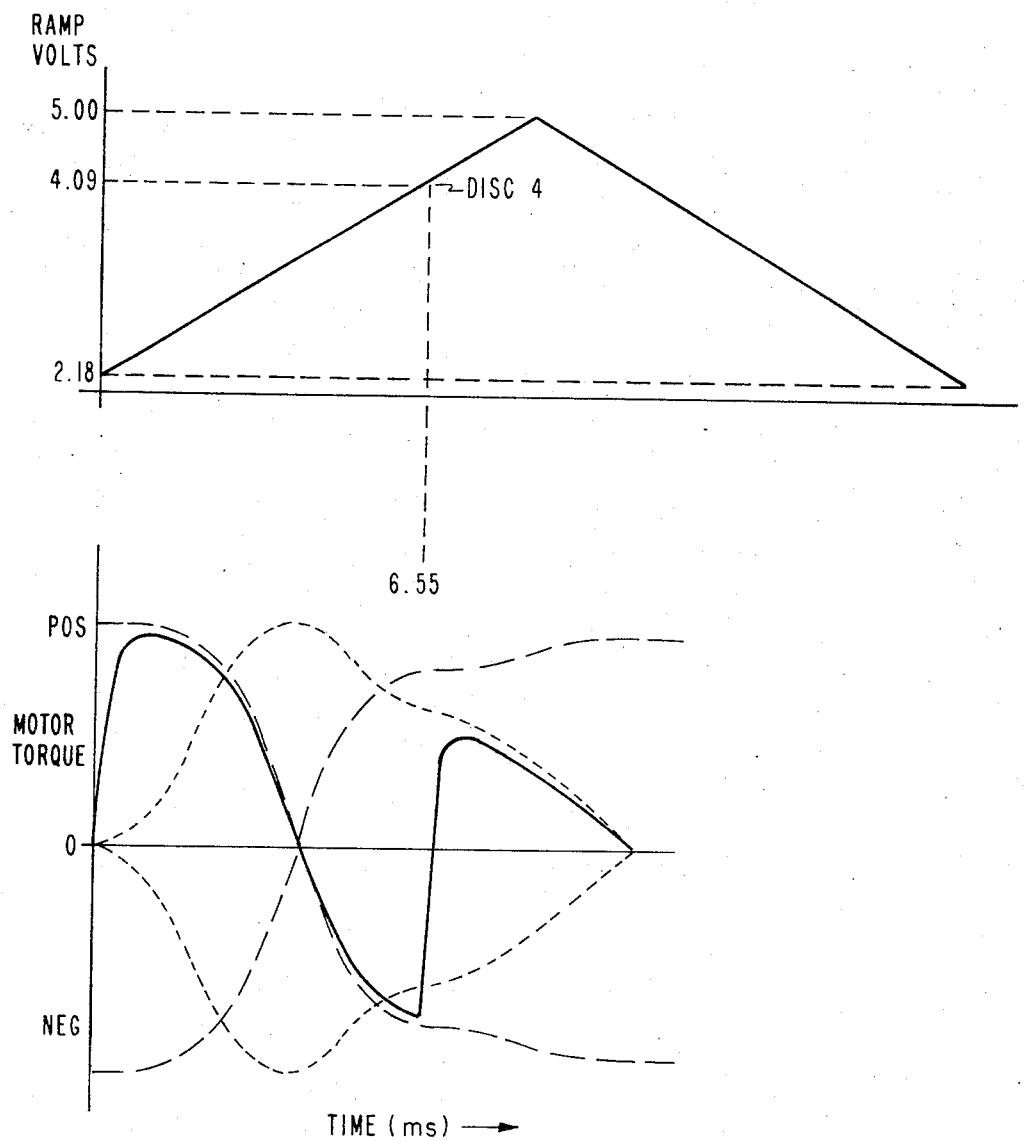
FIG. 5 shows in graphic form, the predetermined time periods and switching angles, employed when incrementing the stepping motor two steps, to achieve a single line advance of the paper.

As the voltage at the output of ramp generator 250 rises, DISC 13 comparator 336 will be the first to switch causing DISC 13 line at the output of 346, shown in FIG. 3, to be rendered inactive. As the output voltage of ramp generator continues to rise at a rate controlled by current source 258, which is in turn controlled by the voltage of the 48 volt motor power supply on line 42, the stepping motor will be accelerating under control of the same +48 motor power supply. As time passes, the ramp generator 250 continues to climb, and the torque generated by windings A1 and B3 of the stepping motor will begin to decline, cross zero and go negative as the motor position changes. As we have determined from our simultaneous solution of the system equation, and as shown in FIG. 5, the motor will have approached its two step equilibrium position after 6.55 milliseconds. At 6.55 milliseconds, a strong, negative deceleration torque being applied to the stepping motor. After 6.55 milliseconds have passed, comparators 336, 334, 332, 330, 328, 326 and 324 have changed state, in response to the rising ramp voltage on terminal 340. As soon as comparator 324 switches, activating DISC 4 line 14 AND gate 186, shown in FIG. 2, will be enabled, causing an output which propagates through OR gate 148 causing JK flip flop 212 to be set on an "on" condition. The "on" output of JK flip flop 212 resets JK flip flop 218, de-energizes A phase winding A1 and energizes A phase winding A2. With windings A2 and B3 energized, FIG. 5 shows that a small and declining positive torque is applied to the stepping motor to settle the stepping motor into its second step, zero torque equilibrium A2, B3 position. In addition to switching power from A phase winding A1 to A2 phase winding A2, the "on" output of JK flip flop 212 is delayed in time delay 216 and used to reset enable (4) latch 182 through AND gate 190. In addition to flipping JK flip flop 212, the outputs of OR gate 148 are sent via line 21 to control unit 10, in FIG. 1, allowing control unit 10 to deactivate RESET AND GATE line 71, thereby conditioning single shots 82 and 86. The outputs of single shots 82 and 86 inhibit printing for 25 milliseconds while the motor is settling to its final rest position. In the interim, ramp generator 250 continues to to provide a positive ramp, until it's output at terminal 340 reaches 5 volts causing comparator 322 to change state and generate a DISC 6 signal on line 116. The DISC 6 signal on line 116 propagates through time delay 140 to reset time latch 130. The outputs of time latch 130 switch ramp generator 250 from a positive ramp to a negative ramp, at approximately 9.65 milliseconds, as shown in FIG. 5. The output of ramp generator 250 will now drop to its stable position of +2.18 volts in preparation for the next paper movement command from the computer. As soon as the output of ramp generator 250 drops less than 2.75 volts, comparator 336 provides a DISC 13 output through inverter 346 onto line 123, enabling one input of AND gate 134 of FIG. 2. Time latch 130 will not be set at this time, however, because the output of OR gate 136 is not active. The 1 LINE signal on line 101 was removed by control unit 10, when the second motor pulse was received at control unit 10 over line 21.

As a second example, of the operation of the invention, the following is an explanation of how it controls the stepping motor to rotate through 12 steps and move paper six lines of print, from the stopping position of our previous single line movement. As explained earlier, the stepping motor will be in a zero torque A2, B3 equilibrium position, after it has moved through two steps from its initial rest position of zero torque A, B4 equilibrium position.

To initiate a six line paper movement, the computer initiates a command over channel 12 to control unit 10. In response to receiving a six line paper movement command, control unit 10, shown in FIG. 1, will activate lines 14 and 18 which will in turn activate AND gate 50 to generate a MULTI-LINE signal on line 105. The signal on line 105 will in turn activate OR gate 136 which will condition the other input of AND gate 134, thereby setting time latch 130 through OR gate 132 and causing ramp generator 250 to begin its positive ramp output. IN addition to setting time latch 130, the output of OR gate 136 will propagate through AND gate 146 and OR gate 148 to reset JK flip flop 212, which in turn resets JK flip flop 224. The "off" output of JK flip flop 212 is propagated through delay 214 to reset, JK flip flop 224 removes power from B phase winding B3 and applies power to B phase winding B4, through drivers 228, and 226 respectively. By simultaneously applying power to A phase winding A2 and B phase winding B4, the condition of the stepping motor is changed from a zero torque equilibrium condition to a maximum torque condition. IN addition to setting time latch 130 and resetting JK flip flop 212, the MULTI-LINE signal on line 105 will set enable (1) latch, enable (2) latch, enable (4) latch, enable (5) latch and enable (6) latch, while the DISC 13 signal is still present on line 123.

Figure 9:
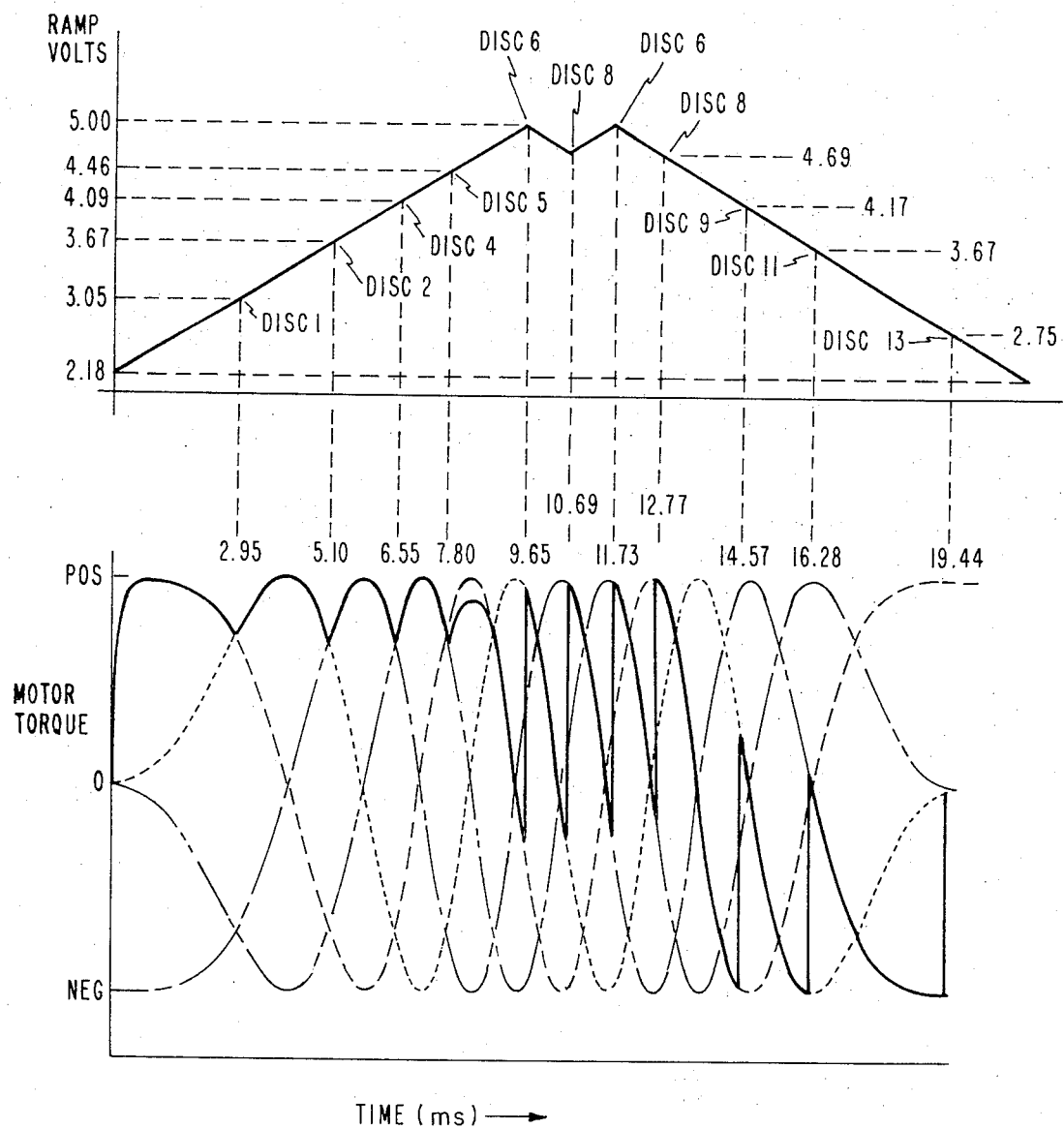
FIG. 9 shows in graphic form, the predetermined time periods and switching angles employed when moving the stepping motor through a plurality of steps to achieve a MULTI-LINE advance of the paper in excess of five lines.

Reference to FIG. 9 will show that if winding A2 and B4 were left energized, the motor would change from a maximum torque condition to a zero, and ultimately negative torque condition as the motor rotates. FIG. 9 shows that if A phase winding A2 is de-energized and A phase winding A1 is energized after 2.95 milliseconds a maximum positive acceleration torque will be maintained by the stepping motor.

The predetermined time period of 2.95 milliseconds is measured by time period generator 40 as the output of ramp generator 250 exceeds 3.04 volts, causing comparator 334 of FIG. 3, to generate a DISC 1 signal on line 111. The DISC 1 signal on line 111 enables AND gate 156 which causes a STEPPER MOTOR PULSE to propagate through OR gate 148 and set JK flip flop 212. The "on" output of JK flip flop 212 sets JK flip flop 218 and is also fed back through delay 216 to reset enable (1) latch 252. The "on" output of JK flip flop 218 energized A phase winding A1 through driver 222 and transistor 231 and de-energized A phase winding A2 via driver 220 and transistor 232. These windings will remain energized until ramp generator 250 has reached 3.67 volts. This will cause comparator 230 to generate a DISC 2 signal on line 112. The DISC 2 signal will activate AND gate 166, shown in FIG. 2, generating a STEPPER MOTOR PULSE which is propagated through OR gate 148 to again reset JK flip flop 212, which will in turn reset enable (2) latch 162 and switch power from B phase winding B4 and B phase B3, in order to maintain a maximum acceleration torque condition within the stepping motor. FIG. 9 shows how the maximum acceleration torque results from switching the winding at 5.1 milliseconds.

The output of ramp generator 250 will continue to rise and pass additional thresholds, such as 3.78 volts causing comparator 328 to generate a DISC 3 signal on line 113. However, since enable (3) latch 172 has not been set by the MULTI-LINE signal on line 105, AND gate 176 of FIG. 2 will not be conditioned and therefore the motor will not switch at this predetermined time period which is utilized only when a two line paper movement command is received from the control unit 10. When the output of ramp generator 250 has exceded 4.09 volts, comparator 324 will generate a DISC 4 signal on line 114 which will provide an output from AND gate 186, because enable (4) latch 82 of FIG. 2 has been set by the MULTI-LINE signal on line 105. The STEPPER MOTOR PULSE provided at the output of AND gate 186 is propagated through AND gate 148 to set JK flip flop 212, resetting enable (4) latch 182 and switching power from A phase winding A1 to A phase winding A2 via JK flip flop 218 and its associated drivers and driving transistors.

The next motor switching operations will occur when a DISC 5 pulse is received from time period generator 40 at 7.8 milliseconds from time zero. The DISC 5 pulse will generate another stepper motor pulse, reset JK flip flop 212 and switch power from B phase winding B3 to B phase winding B4 under control of JK flip flop 224 and its associated drivers and transistors.

Referring to FIG. 9, note that the torque output of the stepping motor was allowed to decline almost to zero before this last winding switch was accomplished. The torque output of the motor was allowed to deviate from a maximum torque condition because our objective at this point in the operation of the stepping motor is to cause the motor to be operating at a running velocity while we continue stepping in a multi-line mode.

Reference to FIG. 9 will show that the motor windings are again, switched at 9.65 milliseconds under control of a signal DISC 6 from time period generator 40. The DISC 6 signal generates a STEPPER MOTOR PULSE, switches power from A phase winding A2 to A phase winding A1 and resets time latch 130 causing ramp generator 250 to begin generating a negative ramp.

Referring to FIG. 9, note that torque provided by the motor is allowed to go negative before the motor windings are switched. The total length of time that negative torque is provided by the stepping motor is somewhat less than the total length to time that positive torque is applied resulting in a net positive torque, just equal to the frictional load being driven by the motor, while it is operating at running velocity.

As ramp generator 250 provides a declining output, a DISC 7 signal will be generated, but no stepper motor pulse will result therefrom, because enable (7) latch has not been set by the MULTI-LINE signal on line 105. When the output of ramp generator 250 has reached 4.69 volts, a DISC 8 signal will be generated on line 118 by time period generator 40. The DISC 8 signal will generate a STEPPER MOTOR PULSE and will switch power from B phase winding B4 to B phase winding B3. The DISC 8 signal will also condition AND gate 138 in FIG. 2, causing time latch 130 to be set to the "on" condition again, thereby forcing ramp generator 250 to cease generating a negative ramp and to commence generating a positive ramp. As long as a MULTI-LINE signal is active on line 105, ramp generator 250 oscillates between a positive and negative ramp thereby, switching power to the windings of the stepper motor at such times so as to generate a small, net positive torque equal to the frictional load and keep the stepper motor running at running velocity. In the six line paper movement example which we are considering, control unit 10 will maintain a MULTI-LINE signal on line 105 until it has received eight stepper motor pulses. The eighth STEPPER MOTOR pulse will be generated when the output of ramp generator 250, again, reaches 5 volts causing comparator 322 to generate another DISC 6 signal and therefore, an eighth STEPPER MOTOR PULSE. The eighth STEPPER MOTOR PULSE will reset enable (6) latch and switch power from A phase winding A1 to A phase winding A2. After receiving the eighth STEPPER MOTOR PULSE, control unit 10 will deactivate the MULTI-LINE signal on line 105 and the RESET AND GATE signal on line 21.

As the output of ramp generator 250 drops past 4.69 volts, a DISC 8 signal is again generated and ninth STEPPER MOTOR PULSE is generated corresponding to a predetermined 1.04 millisecond time period measured from the DISC 6 signal. The ninth STEPPER MOTOR PULSE switches power from B phase winding B3 to B phase winding B4 to continue running velocity for one more step. This last DISC 8 signal will not set time latch 130 because the MULTI-LINE signal on line 105 has been deactivated. As the motor continues to turn, it rotates to a negative torque condition with A phase winding A2 and B phase winding B4 energized.

In order to provide the necessary two degrees of freedom, to get the velocity of the motor to zero at the desired motor rest position, two deceleration negative torque producing switching angles are utilized. The deceleration caused by the two torque torqu producing switching angles is additive, therefore, in the interest of design economy, the predetermined time corresponding to the inverted output of comparator 330 labeled DISC 11, has been chosen as one of the negative torque producing switching angles. The predetermined time period of DISC 9 corresponding to a 4.86 millisecond time period measured from DISC 6 was then selected to give a total deceleration which will result in zero velocity, at the desired rest position.

Figure 6:
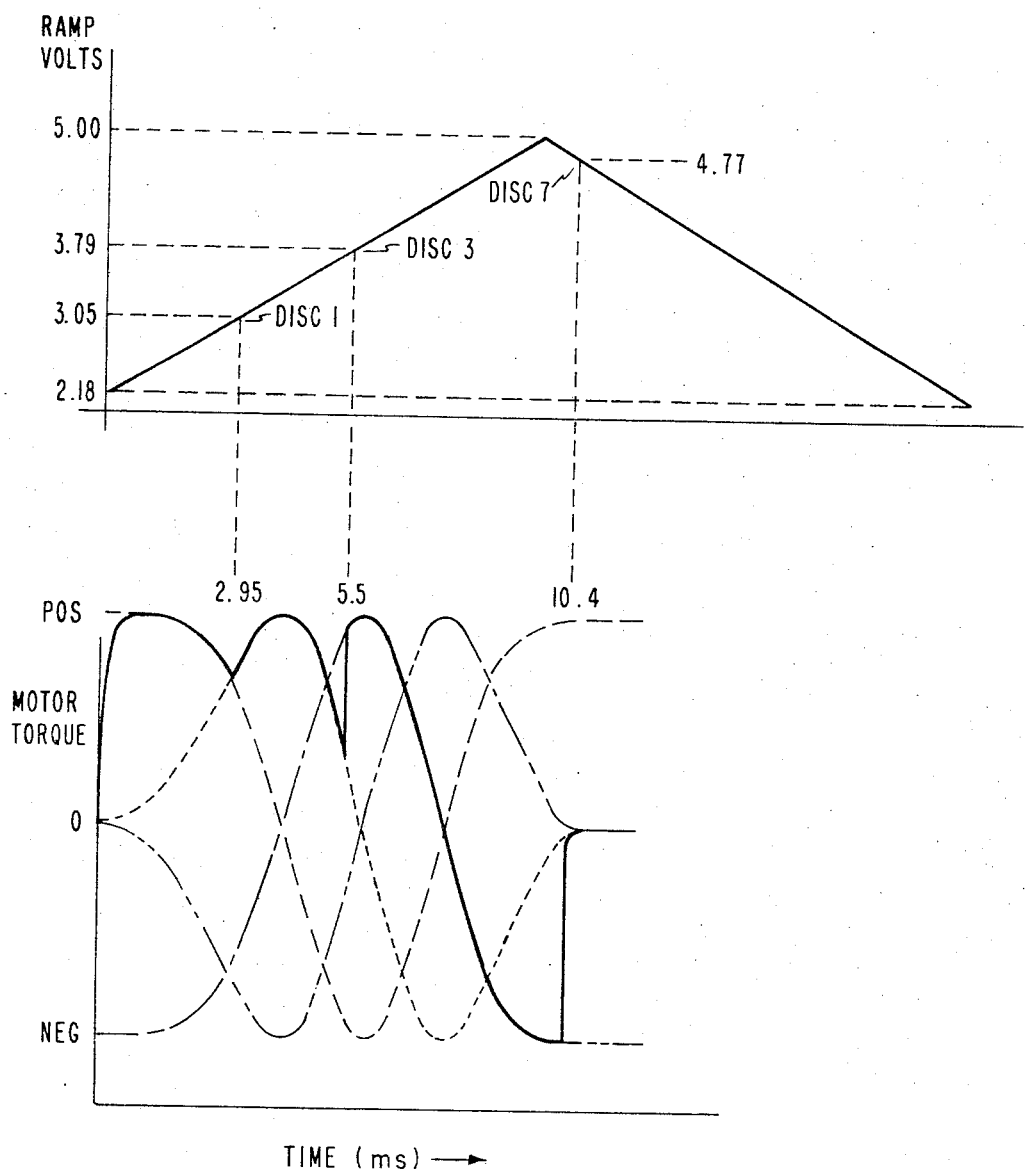
FIG. 6 shows in graphic form, the predetermined time periods and switching angles employed when moving the stepping motor four steps to achieve a double line advance of the paper.
Figure 7:
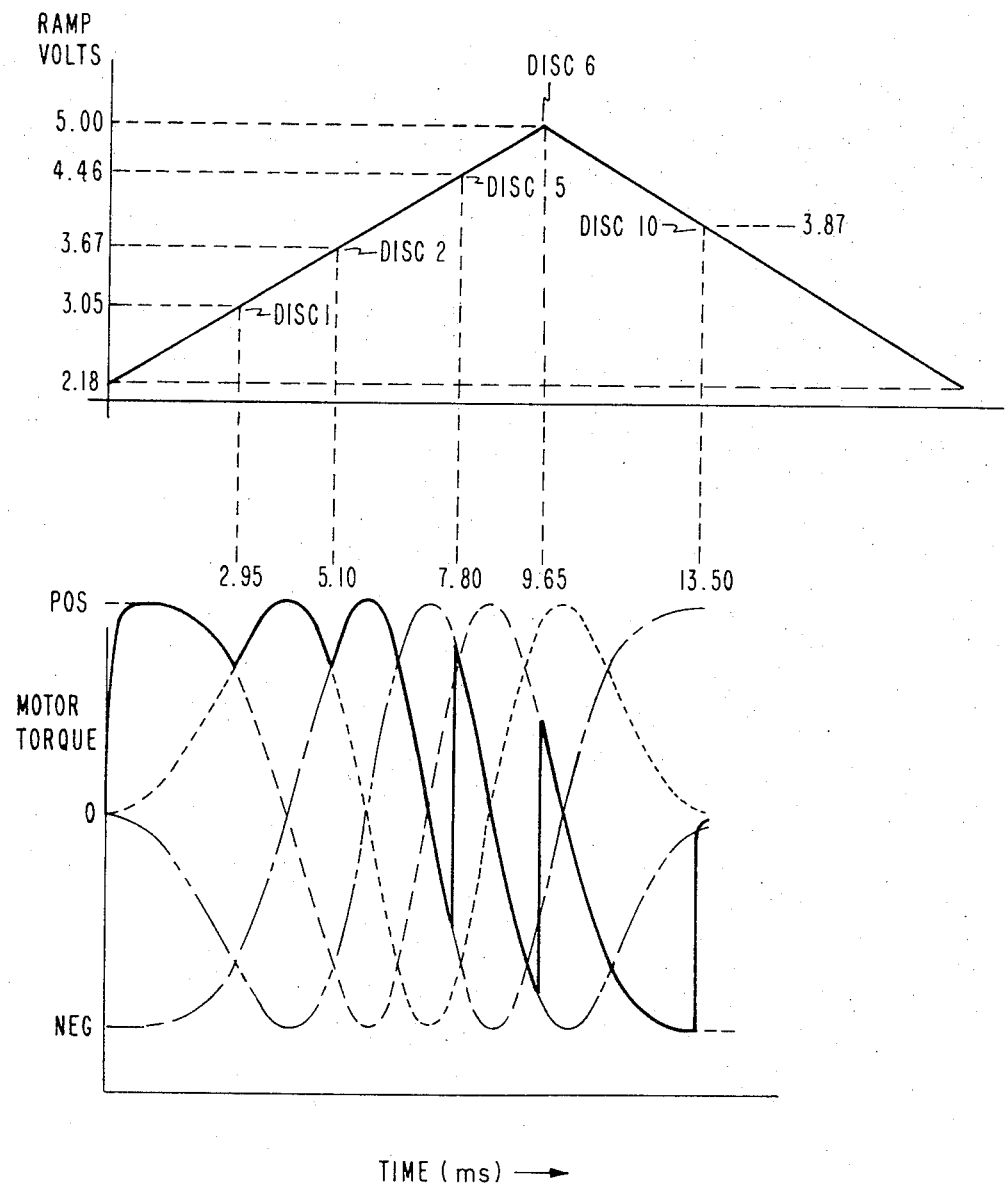
FIG. 7 shows in graphic form, the predetermined time periods and switching angles employed when moving the stepping motor six steps to achieve a triple line advance of the paper.
Figure 8:
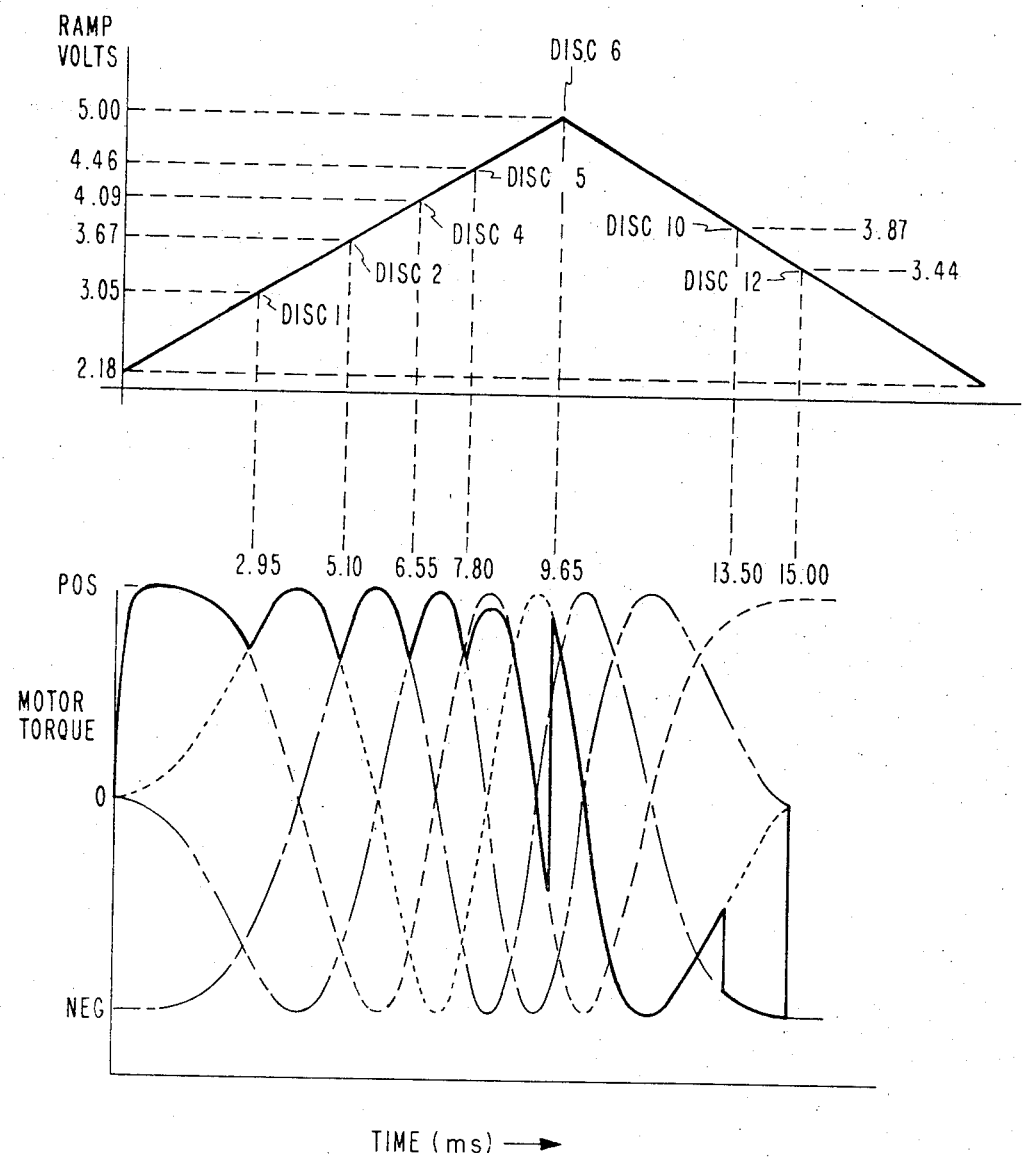
FIG. 8 shows in graphic form, the predetermined time periods and switching angles employed when moving the stepping motor eight steps to achieve a four line advance of the paper.

As the output of ramp generator 250 continues to go down, comparator 300 will generate signals DISC 9 and DISC 11 sequentially to switch power from A phase winding A2 to A phase winding A1 and from B phase winding B4 to B phase winding B3 respectively, providing controlled deceleration of the stepping motor. 7.1 milliseconds after the last DISC 6 signal, the stepping motor will have reached approximately zero velocity at approximately the desired rest position. At this predetermined period of time, time period generator 40 will provide a DISC 13 signal, which will propagate through AND gate 206, and OR gate 148, of FIG. 2, setting JK flip flop 216 and AND gate 210. As JK flip flop 212 is set, JK flip flop 218 will be reset causing drivers 222 and 220 and transistor 431 and 432 to switch power from A phase winding A1 to A phase winding A2 respectively. The motor will now be approximately at rest position with zero velocity and with its hold windings on to hold the motor at this equalibrium A2, B3 angle. This completes the explanation of how the preferred embodiment of the invention controls a stepping motor to increment through 12 steps. Reference to FIGS. 6 through 8, clearly show how a stepping motor would be controlled to increment four steps through eight steps respectively.

While the invention has been particularly shown and described, with reference to a preferred embodiment thereof, it will be understood by those skilled in the art, that various changes in form and details may be made without departing from the spirit and scope of the invention. For example, time period generator 40, which has been described as an analog system, including a ramp generator and a plurality of comparators, could, within the skill of the art be implemented as a digital system. A digital time period generator would include a counter driven by an oscillator to replace the ramp generator and a logical decode circuit to monitor the count within the counter and provide outputs whenever predetermined periods of time have passed. A frequency varying input would be provided to the oscillator to provide power supply compensation or the logical decode circuit could be made to switch at varying counts which are inversely proportional to the motor power supply. Furthermore, while the preferred embodiment has been disclosed in combination with a printer which increments in even numbers of steps it would be well within the skill of the art, to apply the invention in any application where controlled acceleration, running velocity and deceleration is desired and to move the motor in one, three or any other number of step increments, as well as even step increments.

What is claimed is:

1. An open loop paper motion control system for use in a printer comprising:

a stepping motor for advancing paper in continuous motion through any number of lines of print;

time measuring means for providing outputs at predetermined periods of time corresponding to switching times of said stepping motor which provide maximum acceleration, and controlled deceleration of said paper through each of said any number of lines of print;

control unit means for selecting one of said any number of lines of print;

switching means connected to a power supply, to said motor, to said control unit means, and to said time measuring means for selectively switching power from said power supply to windings of said motor at those of said predetermined periods of time which provide maximum acceleration and controlled deceleration of said paper through said selected one of said any number of lines of print.

2. The open loop paper motion control system of claim 1 wherein said time measuring means further comprises compensating means, compensating for changes in the voltage of said power supply by changing said predetermined periods of time to be inversely proportional to the voltage of said power supply.

3. The open loop paper motion control system of claim 1 wherein said control unit means further comprises:

time delay means connected to the output of said control unit means which selects said one of said any number of lines of print for inhibiting printing that amount of time required for said paper to come to rest after having been moved said one of said any number of lines of print.

4. A logic system for controlling the operation of a stepping motor having a known load to provide controlled motion of said motor and load without feedback comprising:

time measuring means for providing outputs at predetermined periods of time corresponding to switching angles of said motor which provide maximum acceleration and controlled deceleration of said motor and load through each number of a plurality of numbers of steps;

enabling means for selecting a sequence of said outputs at predetermined periods of time corresponding to said switching angles when said motor and load move continuously through a number of steps of said plurality of numbers of steps;

switching means connected to said time measuring means, to said enabling means, to a power supply, and to said motor, for selectively switching power from said power supply to windings of said motor whenever outputs of said selected sequence of outputs is received from said time measuring means.

5. The logic system of claim 4 wherein said time measuring means includes compensation means, compensating for variations in the voltage provided by said power supply by varying said predetermined periods of time to be indirectly proportional to the voltage of said power supply.

6. The logic system of claim 5 wherein said time measuring means further includes:

a ramp generator for generating a ramp waveform;

said ramp generator including said compensation means for controlling the output of said ramp generator to be directly proportional to said voltage of said power supply;

comparing means connected to said ramp generator for providing outputs when said output of said ramp generator has reached predetermined levels.

7. The logic system of claim 5 wherein said time measuring means is digital.

8. A method for controlling the operation of a stepping motor having a known load to provide controlled motion of said motor and load without feedback including the steps of:

accumulating an electrical charge in an accumulator at an accumulation rate;

varying said accumulation rate to be directly proportional to the output voltage of a power supply in order to compensate for variations in torque produced by said motor which are caused by variations in the output voltage of said power supply;

selectively connecting power from said power supply to windings of said motor whenever predetermined amounts have been accumulated in said accumulator.

9. The method of claim 8 wherein said selectively connecting step further comprises the steps of:

selecting a first sequence of predetermined amounts;

sequentially switching power from said power supply to windings of said motor as each selected predetermined amount, of said first sequence of predetermined amounts, is accumulated in said accumulator to provide continuous motion of said motor through a first number of steps;

selecting a second sequence of predetermined amounts;

sequentially switching power from said power supply to windings of said motor as each selected predetermined amount, of said second sequence of predetermined amounts, is accumulated in said accumulator to provide continuous motion of said motor through a second number of steps.

10. The method of controlling a motor as in claim 6 to provide continuous motion of said motor from any one to any other one of a plurality of equilibrium angles;

wherein said accumulating step of claim 6 further comprises the steps of:

a. accumulating at a positive rate equal to said accumulation rate until a first predetermined amount has been accumulated within said accumulator;

b. accumulating at a negative rate equal to said accumulation rate until an second predetermined amount has been accumulated within said accumulator;

c. accumulating at said positive rate until said first predetermined amount has been restored to said accumulator whenever said running velocity is to be maintained;

d. repeating steps (b) and (c) while said running velocity is to be maintained;

e. accumulating at said negative rate until a third predetermined amount has been accumulated within said accumulator when deceleration of said motor is desired;

and wherein said selectively connecting step of claim 6 further comprises the steps of:

f. connecting said power supply to selected windings of said motor in sequence as a first sequence of predetermined amounts are accumulated within said accumulator, to provide maximum acceleration of said motor;

g. connecting said power supply to a selected winding of said motor when a fourth predetermined amount has been accumulated within said accumulator to provide that predetermined amount of acceleration necessary for said motor to reach running velocity when loaded with said known load;

h. repeatedly connecting said power supply to selected windings of said motor in sequence as a second sequence of predetermined amounts are repeatedly accumulated within said accumulator while said running velocity is to be maintained;

i. connecting said power supply to selected windings of said motor in sequence as a third sequence of predetermined amounts are accumulated within said accumulator to provide controlled deceleration of said motor while loaded with said known load to allow said motor to come to rest at a preselected one of any one of said equilibrium angles.

11. A method for controlling the operation of a stepping motor having a known load to provide controlled motion of said motor and load without feedback including the steps of:

a. accumulating an electrical charge in an accumulator at an accumulation rate;

b. generating a first sequence of outputs whenever predetermined amounts have been accumulated within said accumulator, said outputs corresponding to switching times of said stepping motor which provide maximum acceleration and controlled deceleration of said motor and load through a first number of steps;

c. selectively connecting power from a power supply to windings of said motor whenever outputs of said first sequence of outputs are generated to provide maximum acceleration and controlled deceleration of said motor and load through said first number of steps.

12. The method of claim 11 further comprising the steps of:

d. generating a second sequence of outputs whenever predetermined amounts have been accumulated within said accumulator, said outputs corresponding to switching times of said stepping motor which provide maximum acceleration and controlled deceleration of said motor and load through a second number of steps;

e. selectively connecting power from said power supply to said windings of said motor whenever outputs of said second sequence of outputs are generated to provide maximum acceleration and controlled deceleration of said motor and load through said second number of stages.

13. A method for controlling the operation of a stepping motor having a known load to provide continuous controlled motion of said motor and load through a first number of steps without feedback including the steps of:

a. accumulating an electrical charge in an accumulator at a positive accumulation rate;

b. generating acceleration outputs whenever predetermined amounts have been accumulated within said accumulator, said acceleration outputs corresponding to switching times of said stepping motor which provide maximum acceleration of said motor and load;
c. selectively connecting power from a power supply to windings of said motor whenever said acceleration outputs are generated to provide maximum acceleration of said motor and load;
d. accumulating in said accumulator at a negative accumulation rate;
e. generating deceleration outputs whenever predetermined amounts have been accumulated within said accumulator, said decelerration outputs corresponding to switching times of said stepping motor which provide controlled deceleration of said motor and load;
f. selectively connecting power from said power supply to windings of said motor whenever said deceleration outputs are generated to bring said motor and load to rest after traversing said first number of steps;
g. terminating said accumulating at said negative accumulation rate when the contents of said accumulator have returned to a common reference amount.

14. The method of claim 13 wherein said positive and said negative accumulation rates are directly proportional to the output voltage of said power supply in order to compensate for variations in torque produced by said motor which are caused by variations in the output voltage of said power supply.

15. The method of claim 14 wherein said positive and said negative accumulation rates are equal.

16. The method of claim 13 further comprising the additional steps, between step (c) and step (d), of:
c1. generating at least one controlled acceleration output, said controlled acceleration output corresponding to a switching time of said motor which provides controlled acceleration of said motor and load to reach running velocity without overshoot and without excessive oscillation about said running velocity;
c2. selectively connecting power from said power supply to windings of said motor whenever said additional output is generated to provide said controlled acceleration;
c3. accumulating in said accumulator alternately at a negative rate and at a positive rate;
c4. generating running outputs corresponding to switching times of said motor which provide a net positive torque equal to friction of said motor and load;
c5. selectively connecting power from said power supply to windings of said motor whenever said running outputs are generated to provide said net positive torque.

* * * * *